United States Patent
Takahashi et al.

(10) Patent No.: US 8,773,728 B2
(45) Date of Patent: Jul. 8, 2014

(54) IMAGE FORMING APPARATUS, METHOD FOR AUTOMATICALLY EDITING DOCUMENT DATA, AND COMPUTER-READABLE STORAGE MEDIUM FOR COMPUTER PROGRAM

(75) Inventors: Kazusei Takahashi, Nishinomiya (JP); Manabu Furukawa, Nagaokakyo (JP); Hideyuki Matsuda, Hirakata (JP); Nobuhiro Mishima, Osaka (JP); Mitsuharu Nagai, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 145 days.

(21) Appl. No.: 13/415,499

(22) Filed: Mar. 8, 2012

(65) Prior Publication Data

US 2012/0229825 A1  Sep. 13, 2012

(30) Foreign Application Priority Data

Mar. 8, 2011 (JP) ................. 2011-049907

(51) Int. Cl.
   *H04N 1/40* (2006.01)
(52) U.S. Cl.
   USPC .......................................... 358/468; 358/453
(58) Field of Classification Search
   USPC ........... 358/1.9, 2.1, 468, 452–453, 462, 464, 358/400–405, 500, 523
   See application file for complete search history.

(56) References Cited

U.S. PATENT DOCUMENTS

| | | | |
|---|---|---|---|
| 5,555,101 A * | 9/1996 | Larson et al. | 358/403 |
| 7,202,965 B2 * | 4/2007 | Korn | 358/1.15 |
| 7,221,800 B2 * | 5/2007 | Sesek et al. | 382/229 |
| 8,139,902 B2 * | 3/2012 | Lapstun et al. | 382/321 |
| 2004/0139066 A1 | 7/2004 | Yokohari et al. | |

FOREIGN PATENT DOCUMENTS

| | | |
|---|---|---|
| JP | 2001-22738 | 1/2001 |
| JP | 2002-169824 | 6/2002 |
| JP | 2002-189714 | 7/2002 |
| JP | 2004-220215 | 8/2004 |
| JP | 2008-199151 | 8/2008 |
| JP | 2009-48589 | 3/2009 |
| JP | 2010-67233 | 3/2010 |
| JP | 2010-282587 | 12/2010 |

OTHER PUBLICATIONS

Notification of Reasons for Refusal mailed Mar. 5, 2013, directed to JP Application No. 2011-049907; 6 pages.

\* cited by examiner

*Primary Examiner* — Thomas D Lee
*Assistant Examiner* — Stephen M Brinich
(74) *Attorney, Agent, or Firm* — Osha Liang LLP

(57) ABSTRACT

An image forming apparatus configured to store document data therein and to perform network communication is provided. The image forming apparatus includes a detection portion configured to detect, from a document to be saved, an unfinished part where a detection index and attribute data are described, the attribute data indicating an attribute of yet-to-be-written information to be written into the unfinished part; an obtaining portion configured to obtain information to be written into the unfinished part from a server connected to the image forming apparatus via a network based on the attribute data and information described in a vicinity of the unfinished part; and an editing portion configured to perform automatic editing by which the information obtained from the server is written into the unfinished part.

15 Claims, 19 Drawing Sheets

FIG. 3

| TYPE | | KEYWORD | |
|---|---|---|---|
| DETECTION INDEX | | (TBD, YET-TO-BE-COMPLETED, BEING CREATED, IN PROGRESS, STILL NOT DONE, UNDER CONSIDERATION) | }50 |
| ATTRIBUTE | DRAWING | (DRAWING, FIG., FIGURE) | }60 |
| | FORMULA | (FORMULA, MATHEMATICAL FORMULA, CALCULATING FORMULA, EQUATION) | |
| | TABLE | (CHART, TABLE) | |
| | NUMERICAL DATA | (NUMBER, VALUE) | |
| | DESIGN TARGET VALUE | (TARGET VALUE, DESIGN VALUE, DESIGN TARGET VALUE, OUTPUT TARGET VALUE) | |
| | VARIABLE DATA | (VARIABLE, PARAMETER, DESIGN VARIABLE, DESIGN PARAMETER) | |
| | ⋮ | ⋮ | |

| SPONSOR COMPANY NAME | PERFORMANCE | 2008 | 2009 | 2010 (WORLD CUP YEAR) |
|---|---|---|---|---|
| ABCD BEVERAGE | SALES | TBD (NUMBER) | TBD (NUMBER) | TBD (NUMBER) |
| | RECURRING PROFIT | TBD (NUMBER) | TBD (NUMBER) | TBD (NUMBER) |
| | COMPANY POPULARITY RATINGS | TBD (NUMBER) | TBD (NUMBER) | TBD (NUMBER) |
| EFG BURGER | SALES | TBD (NUMBER) | TBD (NUMBER) | TBD (NUMBER) |
| | RECURRING PROFIT | TBD (NUMBER) | TBD (NUMBER) | TBD (NUMBER) |
| | COMPANY POPULARITY RATINGS | TBD (NUMBER) | TBD (NUMBER) | TBD (NUMBER) |
| HIJK ELECTRIC | SALES | TBD (NUMBER) | TBD (NUMBER) | TBD (NUMBER) |
| | RECURRING PROFIT | TBD (NUMBER) | TBD (NUMBER) | TBD (NUMBER) |
| | COMPANY POPULARITY RATINGS | TBD (NUMBER) | TBD (NUMBER) | TBD (NUMBER) |

(UNIT: JAPANESE MILLION YEN) — 401, A1

(SOURCE: LMN RESEARCH INSTITUTE) — 402

FIG. 6

| JOB DETAILS | 1) OBTAINING DATA FROM SERVER |
| --- | --- |
| | 2) ADDING DATA |
| ADDITIONAL DATA DETAILS | NUMERICAL DATA : ABCD BEVERAGE - SALES (2008, 2009, 2010) |
| | NUMERICAL DATA : ABCD BEVERAGE - RECURRING PROFIT (2008, 2009, 2010) |
| | NUMERICAL DATA : ABCD BEVERAGE - COMPANY POPULARITY RATINGS (2008, 2009, 2010) |
| | NUMERICAL DATA : EFG BURGER - SALES (2008, 2009, 2010) |
| | NUMERICAL DATA : EFG BURGER - RECURRING PROFIT (2008, 2009, 2010) |
| | NUMERICAL DATA : EFG BURGER - COMPANY POPULARITY RATINGS (2008, 2009, 2010) |
| | NUMERICAL DATA : HIJK ELECTRIC - SALES (2008, 2009, 2010) |
| | NUMERICAL DATA : HIJK ELECTRIC - RECURRING PROFIT (2008, 2009, 2010) |
| | NUMERICAL DATA : HIJK ELECTRIC - COMPANY POPULARITY RATINGS (2008, 2009, 2010) |
| ACCESS TARGET SERVER | SERVER OF LMN RESEARCH INSTITUTE, SERVER OF COMPANY PERFORMANCE PROVIDER |

| SPONSOR COMPANY NAME | PERFORMANCE | 2008 | 2009 | 2010 (WORLD CUP YEAR) |
|---|---|---|---|---|
| ABCD BEVERAGE | SALES | 580,860 | 551,817 | TBD (NUMBER) |
| | RECURRING PROFIT | 17,425 | 16,002 | TBD (NUMBER) |
| | COMPANY POPULARITY RATINGS | 22 | 34 | TBD (NUMBER) |
| EFG BURGER | SALES | 298,012 | 312,263 | TBD (NUMBER) |
| | RECURRING PROFIT | 8,940 | 9,367 | TBD (NUMBER) |
| | COMPANY POPULARITY RATINGS | 153 | 148 | TBD (NUMBER) |
| HIJK ELECTRIC | SALES | 7,024,300 | 7,316,980 | TBD (NUMBER) |
| | RECURRING PROFIT | 210,729 | 234,143 | TBD (NUMBER) |
| | COMPANY POPULARITY RATINGS | 472 | 453 | TBD (NUMBER) |

UNIT: JAPANESE MILLION YEN

SOURCE: LMN RESEARCH INSTITUTE

FIG. 8

| ACCESS TARGET SERVER | | |
|---|---|---|
| SERVER OF LMN RESEARCH INSTITUTE http://www.LMN_-reserch.com/ | JOB RESULT | OK |
| | REFLECTED PAGE | 13 |
| SERVER OF COMPANY PERFORMANCE PROVIDER http://www.company-Information.co.jp/ | JOB RESULT | NG |
| | REFLECTED PAGE | - |

| | 92 |
|---|---|
| JOB DETAILS | 1) OBTAINING DATA FROM SERVER |
| | 2) ADDING DATA |
| ADDITIONAL DATA DETAILS | FORMULA: VCVS LOW PASS FILTER, CUTOFF FREQUENCY |
| | DRAWING: CIRCUIT DIAGRAM, VCVS LOW PASS FILTER |
| | VARIABLE DATA : C-VCVS LOW PASS FILTER |
| | VARIABLE DATA : R-VCVS LOW PASS FILTER |
| | VARIABLE DATA : L-VCVS LOW PASS FILTER |
| | DESIGN TARGET VALUE : CUTOFF FREQUENCY, VCVS LOW PASS FILTER (APPROXIMATELY 1000 Hz) |
| ACCESS TARGET SERVER | NONE SPECIFIED |

FIG. 14

| FIELD 1 | FIELD 2 | INFORMATION PROVIDER NAME | CONTACT METHOD | CORRESPONDENCE ADDRESS |
|---|---|---|---|---|
| HARDWARE | ANALOGUE CIRCUIT | MR. A | E-mail | A@△□.co.jp |
| | DIGITAL CIRCUIT | MR. B | Twitter | http://twitter.△□.co.jp/B |
| | POWER SOURCE CIRCUIT | MR. C | E-mail | C@△□.co.jp |
| | ASIC | MR. D | E-mail | D@△□.co.jp |
| SOFTWARE | DEVICE DRIVER | MR. E | Twitter | http://twitter.△□.co.jp/E |
| | DATA PROCESSING | MR. F | E-mail | F@△□.co.jp |
| | USER INTERFACE | MR. G | E-mail | G@△□.co.jp |
| | PRODUCT SPECIFICATIONS | MR. H | E-mail | H@△□.co.jp |
| | COMMUNICATION | MR. I | E-mail | I@△□.co.jp |
| | APPLICATION | MR. J | E-mail | J@△□.co.jp |
| | | | | |

MR. /MRS. ***** WOULD LIKE TO GET THE FOLLOWING INFORMATION.
PLEASE SEE THE PASSAGE BELOW AND PROVIDE INFORMATION RELATING TO "TBD"
OF THE PASSAGE.
YOU CAN SEND THE INFORMATION BY ANY OF THE FOLLOWING METHODS.

(1) DESCRIBE THE INFORMATION IN THIS E-MAIL MESSAGE AND SEND THE MESSAGE
    BACK TO THE SENDER.
(2) ATTACH A DOCUMENT CONTAINING THE INFORMATION TO THIS E-MAIL MESSAGE
    AND SEND THE MESSAGE BACK TO THE SENDER.
(3) WRITE THE LOCATION OF A DOCUMENT CONTAINING THE INFORMATION IN THIS
    E-MAIL MESSAGE AND SEND THE MESSAGE BACK TO THE SENDER.
(4) WRITE A SERVER ADDRESS WHERE THE INFORMATION IS PROBABLY AVAILABLE IN
    THIS E-MAIL MESSAGE AND SEND THE MESSAGE BACK TO THE SENDER.

THANK YOU FOR YOUR COOPERATION IN THIS MATTER.

CUTOFF FREQUENCY LOW PASS FILTER IS DEFINED BY THE
FOLLOWING CIRCUIT DIAGRAM AND FORMULA.

TBD (DRAWING)

TBD (FORMULA)

WHERE

C=TBD (PARAMETER), R=TBD (PARAMETER), L=TBD (PARAMETER),

CUTOFF FREQUENCY  fc=TBD (DESIGN TARGET VALUE : APPROXIMATELY 1000Hz)

IMAGE FORMING APPARATUS, METHOD FOR AUTOMATICALLY EDITING DOCUMENT DATA, AND COMPUTER-READABLE STORAGE MEDIUM FOR COMPUTER PROGRAM

This application is based on Japanese patent application No. 2011-049907 filed on Mar. 8, 2011, the contents of which are hereby incorporated by reference.

BACKGROUND OF THE INVENTION

1. Field of the Invention

The present invention relates to an image forming apparatus configured to store document data therein, a method for automatically editing document data, and a computer-readable storage medium for computer program executed in the image forming apparatus. An example of the image forming apparatus is an information device called a Multi-functional peripheral (MFP).

2. Description of the Related Art

An MFP is used for copying and network printing both of which are uses of an image forming apparatus. The MFP is also used to input, store, and transfer a document. The MFP has a box functioning as a data folder in which documents are stored, and is capable of saving a document inputted by scanning a document sheet or by communicating with an external device via a network. The MFP also serves to, in response to operation performed by a user, print a document stored in a box; attach the document to an e-mail message for transmission; convert the document into facsimile data for transmission; and transfer the document to an external device.

As another function of the MFP, there is known a function to obtain a Web page registered in a Web site on the Internet or an intranet. There is proposed an MFP that detects, from a Web page designated by a user, a link to a printing page contained in the Web page, obtains the printing page from the linked page, and performs printing (Japanese Laid-open Patent Publication No. 2008-199151). Such an MFP enables a user to obtain a printed matter of a Web page by operating the MFP without the use of a personal computer or other information devices.

Further, attempts have conventionally been made to create a document automatically. For example, a document automatic creation system is proposed which creates documents such as operation manuals of a variety of devices (Japanese Laid-open Patent Publication No. 2001-022738). The system gathers, from a plurality of servers on a network, system data kept in each server, embed the gathered data in a template, and creates a document. There is also proposed a method for supporting document creation (Japanese Laid-open Patent Publication No. 2002-189714). The method involves searching Web pages publicized on the Internet for a Web page containing a predetermined keyword; extracting only articles each of which contains the keyword from the Web page found out by the search; combining the extracted articles together; and creating a document.

In companies and organizations improving business efficiency, it is useful to reduce the workload to create various kinds of documents, e.g., a proposal, a specification, and meeting materials. However, according to document automatic creation using a template such as that disclosed in Japanese Laid-open Patent Publication No. 2001-022738, the type of a document to be created is limited depending on the template. In addition, if a user intends to create different types of documents, an effort is required to prepare, in advance, a template for each type of the documents. In the meantime, the document creation support method described in Japanese Laid-open Patent Publication No. 2002-189714 can be used only to create a document citing text (article, for example) containing a predetermined keyword. The method cannot be used to create a document in which not only text but information other than the text, e.g., a drawing or table, is disposed at any location (page, line) of the document.

SUMMARY

The present disclosure is directed to solve the problems pointed out above, and therefore, an object of an embodiment of the present invention is to provide an image forming apparatus by means of which the workload to create any type of document is reduced, in consideration of the current network communication technique by which the Internet or a cloud service is available.

An image forming apparatus according to an aspect of the present invention is an image forming apparatus configured to store document data therein and to perform network communication. The image forming apparatus includes a detection portion configured to detect, from a document to be saved, an unfinished part where a detection index and attribute data are described, the attribute data indicating an attribute of yet-to-be-written information to be written into the unfinished part; an obtaining portion configured to obtain information to be written into the unfinished part from a server connected to the image forming apparatus via a network based on the attribute data and information described in a vicinity of the unfinished part; and an editing portion configured to perform automatic editing by which the information obtained from the server is written into the unfinished part.

These and other characteristics and objects of the present invention will become more apparent by the following descriptions of preferred embodiments with reference to drawings.

BRIEF DESCRIPTION OF THE DRAWINGS

FIG. 3 is a diagram showing an example of a keyword table referred to for detection of an unfinished part in a document.

FIG. 5 is a diagram showing yet-to-be-written information in a document according to a first example of automatic editing.

FIG. 6 is a diagram showing data details of a search job according to a first example of automatic editing.

FIG. 7 is a diagram showing an edit result according to a first example of automatic editing.

FIG. 8 is a diagram showing an example of an operating history.

FIG. 12 is a diagram showing data details of a search job according to a second example of automatic editing.

FIG. 14 is a diagram showing an example of an information provider list referred to for making an information provision request.

FIG. 15 is a diagram showing an example of an e-mail message used for making an information provision request.

DESCRIPTION OF THE PREFERRED EMBODIMENTS

Figure 1:
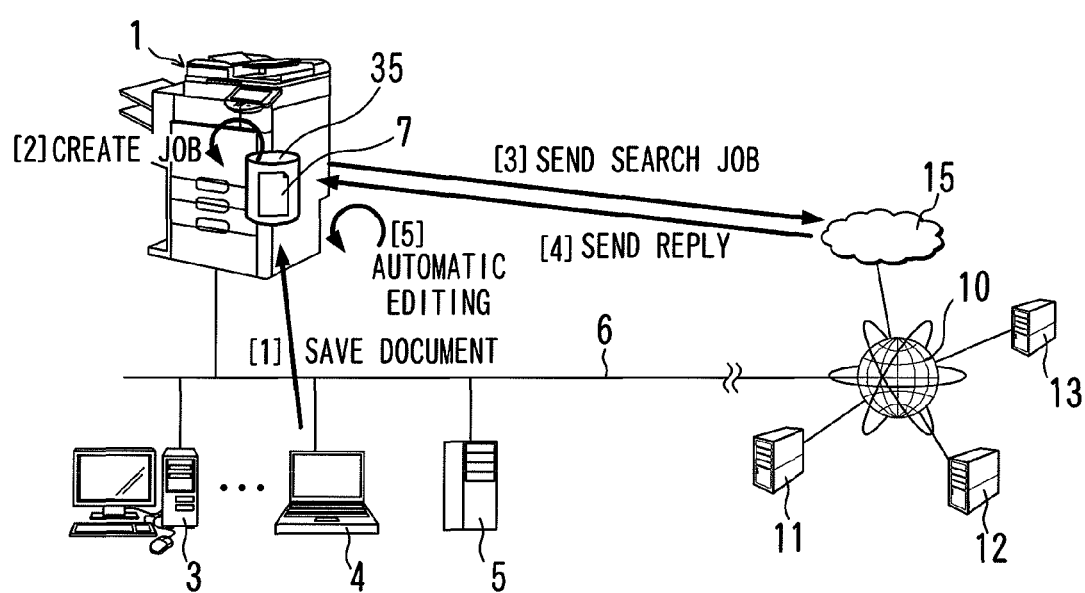
FIG. 1 is a diagram showing an outline of document data processing performed on a network according to an embodiment of the present invention.

FIG. 1 shows an MFP 1 as an example of an image forming apparatus. The MFP 1 is an information device for business use connected to a Local Area Network (LAN) 6 constructed in, for example, an office of business. The MFP 1 is capable of performing communication, via a network, with external devices such as a plurality of personal computers (hereinafter, each of which is referred to as a "PC") 3 and 4, and a server 5 all of which are located on the LAN 6. The MFP 1 is also capable of accessing, via the LAN 6, servers 11, 12, and 13 of a Web site where information is publicized on the Internet 10, and a cloud system 15 that provides information retrieval service. Three servers 11, 12, and 13, and one cloud system 15 are shown in FIG. 1. In practical cases, however, many Web sites and any thereof may be accessed from the MFP 1.

The MFP 1 is provided with a box 35 used to store documents therein. The box 35 is a part of a memory area of a non-illustrated storage provided in the MFP 1. The box 35 stores, therein, a document transferred as data from the PC 3 or the PC 4, and a document read out from a document sheet by an image scanner of the MFP 1. The box 35 is used as a data folder into which users accumulate documents individually, and by which users share the documents with one another. A user of the MFP 1 directly operates an operating panel thereof or indirectly operates the MFP 1 through the PC 3 or the PC 4 to control the MFP 1 to perform a variety of processes such as printing of a document stored in the box 35, transmission of the document via e-mail, and transmission of the document via facsimile. Each user is able to use the PC 3 or the PC 4 to browse the contents of documents in the box 35, and to edit the same.

In the meantime, the MFP 1 capable of storing documents as described above has a characteristic function. The function is an automatic editing function by which, when an incomplete document is stored, the incomplete document is brought close to a completed state. The incomplete document is a document-in-process in which a part of information to be added by the document creator is not written yet. For example, the incomplete document is a document that is temporarily saved under a state where the creator thinks of checking later the formal name of a trivial name or the correct meaning of a term for supplement, thinks of looking for a photo or chart as a reference material of a written sentence and putting the same on the document later, or thinks of obtaining published statistics to put the same on the document later. It is noted, however, that an incomplete document to be edited by using the automatic editing function is a document in which at least one set of a predetermined index and attribute data indicating an attribute of information to be added is described. Such an index and attribute data are registered into the MFP 1 in advance by the user. As described later, an example of the index is a character string of "TBD" (to be determined) or "under consideration" which means an incomplete state. The attribute data is character data representing an attribute, and an example of the attribute data is "numeric value" or "figure".

FIG. 1 shows an outline of how to perform the automatic editing by taking an example in which the PC 4 requests the MFP 1 to save a document 7. The procedural steps are given below.

(1) Under a state where indices and attribute data are already registered in the MFP 1, the PC 4 instructs the MFP 1 to save an incomplete document 7 to the box 35, and transfers the document 7 to the MFP 1.

(2) Upon receiving the document 7, the MFP 1 searches data of the document 7 and detects an unfinished part in which an index and attribute data are written. The MFP 1 then generates a search job to obtain, from a server on a network including the LAN 6 and the Internet 10, information to be written into the unfinished part, i.e., information assumed to be added by the document creator. A search job usually contains a plurality of search keywords. The MFP 1 can sometimes identify a server from which the information to be written is obtained based on the information to be written into the unfinished part, and sometimes cannot.

(3) The MFP 1 sends the generated search job to a receiving end on the network. In the illustrated example of FIG. 1, the MFP 1 sends the search job to the cloud system 15 providing information retrieval service.

(4) The receiving end of the search job executes the search job and sends a search reply to the MFP 1.

(5) The MFP 1 performs automatic editing through which information received as the search reply is incorporated in the unfinished part of the document 7. The MFP 1 then saves a document that has been subjected to the automatic editing, i.e., a post-automatic-editing document, together with the original document 7 before being subjected to the automatic editing, or, instead of the original document 7. At this time, the document is saved in such a manner that the user can easily know whether or not the automatic editing has been performed on the document. For example, a character string or symbol representing the automatic editing is added to a file name of the document. Alternatively, an appropriate subfolder is prepared in which the post-automatic-editing document and the original document are saved separately from each other.

Figure 2:
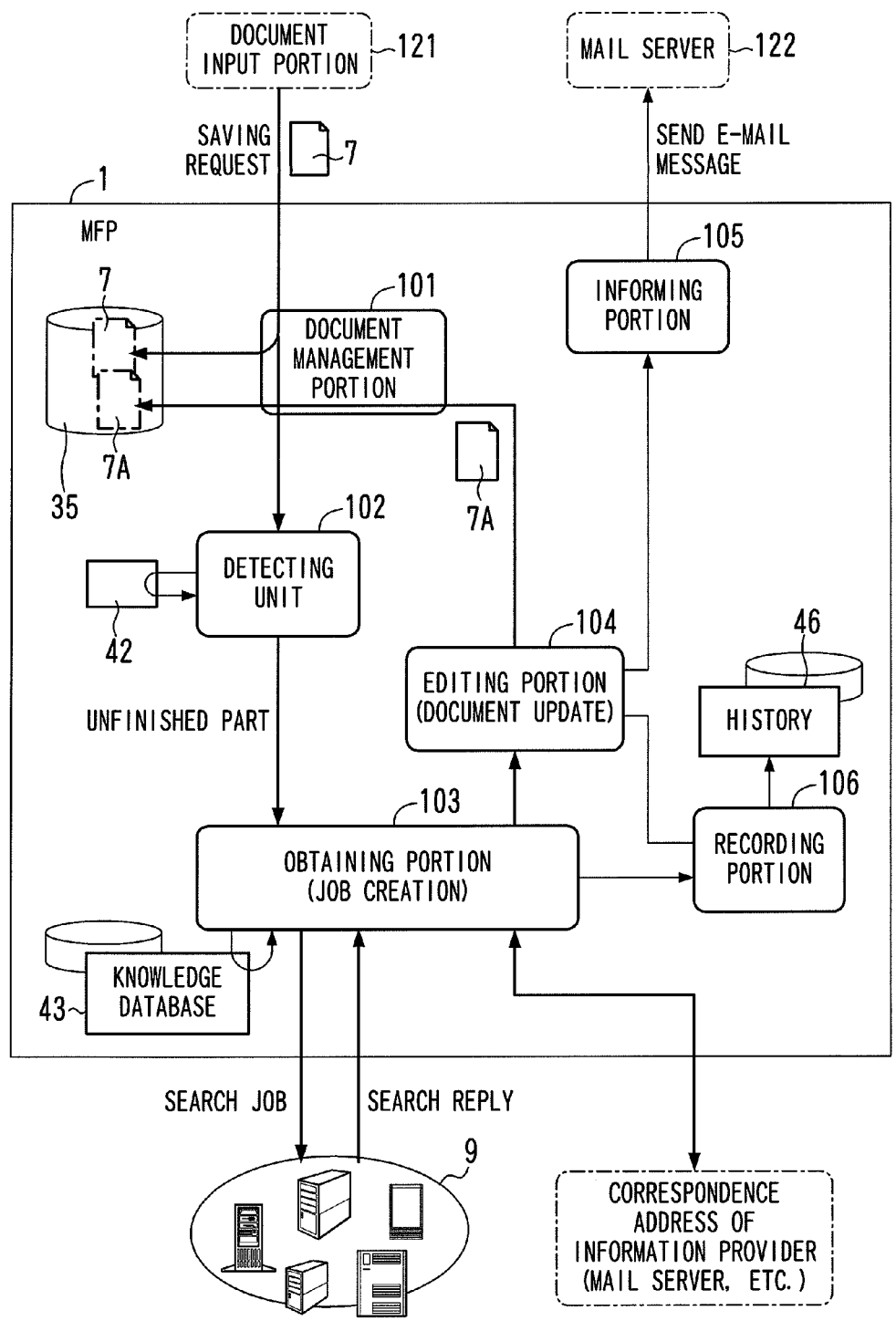
FIG. 2 is a diagram showing an example of the functional configuration relating to document data processing performed by an MFP.

FIG. 2 is a diagram showing an example of the functional configuration relating to document data processing performed by the MFP 1. The MFP 1 is configured of a document management portion 101, a detecting unit 102, an obtaining portion 103, an editing portion 104, an informing portion 105, a recording portion 106, and so on. These portions are functional elements implemented when a central processing unit (CPU) of a control circuit which serves to control the MFP 1 executes a predetermined computer program.

The document management portion 101 receives a document 7 to be saved from a document input portion 121 which makes a document saving request. The document input portion 121 is a functional portion implemented by a document creation application installed on, for example, each of the PC 3 and the PC 4. When receiving the document 7, the document management portion 101 writes the document 7 onto the box 35, and causes the detecting unit 102 to start a process on the document 7 stored in a work area for program execution. Meanwhile, when being instructed to save a document read out by the image scanner of the MFP 1, the document management portion 101 performs a process similar to the process discussed above on the document inputted from the image scanner.

The detecting unit 102 serves to detect, from the document 7 to be saved, an unfinished part in which a detection index and attribute data indicating an attribute of yet-to-be-written information are described. At this time, the detecting unit 102 refers to a keyword table 42. Referring to FIG. 3, at least one index 50 and at least one set of attribute data 60 that are registered in advance by the user are stored in the keyword table 42. In the case where the table of FIG. 3 is referred to, the detecting unit 102 detects a part where any of the six indices 50 of "TBD", "yet-to-be-completed", "being created", "in progress", "still not done", and "under consideration", and any of attribute data 60 of "drawing", "Fig.", . . . "formula", "mathematical formula" . . . "chart", "Table" . . . "design variable", "design parameter" indicating attributes classified into a plurality of kinds of drawing, formula, table, numerical data, design target value, and variable data are described adjacent to each other. The number of unfinished parts in one document 7 depends on how many sets of index 50 and attribute data 60 the creator of the document 7 describes. In some cases, only one unfinished part is detected, and in other cases, a plurality of unfinished parts are detected. Further, no unfinished parts are detected according to circumstances.

Referring back to FIG. 2, the obtaining portion 103 obtains information to be written into the unfinished part detected by the detecting unit 102 from a server on the network 9 including the LAN 6 and the Internet 10. In order to obtain the information, the obtaining portion 103 assumes, in accordance with a predetermined algorithm, what kind of information corresponds to yet-to-be-written information to be incorporated into the unfinished part, i.e., a matter meant by the yet-to-be-written information rather than the yet-to-be-written information itself. The assumption is made based on the attribute data of the unfinished part and information (character, term, sentence, line, figure, photo, and so on) described in its vicinity. At this time, a knowledge database 43 of the MFP 1 is referred to. After the assumption, the obtaining portion 103 creates a search job to make a yet-to-be-written information search request, and sends the search job to the server on the network 9. The obtaining portion 103, then, conveys, to the editing portion 104, information obtained from the server as the search reply.

The editing portion 104 performs automatic editing to write the information obtained by the obtaining portion 103 into the unfinished part. In the automatic editing, it is possible to automatically delete the index and attribute data to save the user from having to delete the same. Alternatively, it is possible to remain the index and attribute data unchanged to make it easy for the user to confirm the result of automatic editing. In the latter case, a format modification is made to the index and attribute data to be retained, e.g., underlines are applied thereto, or, the font thereof is changed. This makes it possible to distinguish the index and attribute data to be retained from an index and attribute data of an unfinished part for which the automatic editing has not yet been performed. The document 7 has undergone the automatic editing as discussed above, so that a document 7A, i.e., an updated document 7, is obtained. The document management portion 101 saves the document 7A to the box 35. At this time, the document management portion 101 gives, to the document (post-update document) 7A, a file name different from the file name of the document 7 (pre-update document 7, original document 7). This makes it easier for the user to identify the file.

The informing portion 105 informs the user, who gave a command to save the document 7, that the document 7 has been automatically updated by the editing portion 104. When e-mail is used to inform the user of the fact, an e-mail message addressed to the user whose mail address is registered in advance is sent to a mail server 122. The mail server 122 may be provided in the MFP 1 or in another device on the LAN 6. A mail service provided by a communication carrier may be used as the mail server 122. The user may be informed of the fact by viewing a popup message displayed on a display of the PC 3 or the PC 4, or on a display of the operating panel thereof.

The recording portion 106 serves to make a record of an operating history 46 based on which the user can check the information obtained from the server. For example, the recording portion 106 records a Uniform Resource Locator (URL) for identifying the source of the obtained information. The user can check reliability of the information by browsing a Web page corresponding to the recorded URL, or can obtain further information from the Web page.

Descriptions are provided below of examples of automatic editing performed by the MFP 1.

First Embodiment

Figure 4:
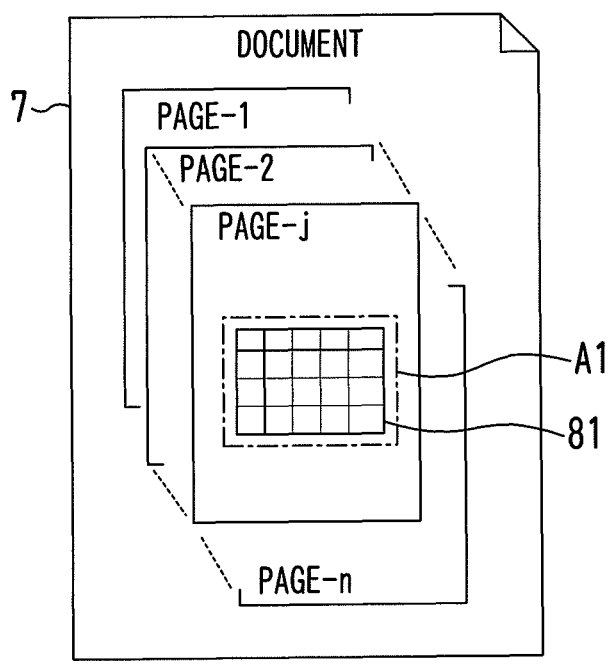
FIG. 4 is a schematic diagram showing a document according to a first example of automatic editing.

FIG. 4 is a schematic diagram showing a document 7 according to a first example of the automatic editing. The document 7 has pages from Page 1 through Page n. The j-th page of the document 7 contains a table 81 in a region A1 enclosed by a dot-dash line. Note that the table 81 has not yet been finished as shown in FIG. 5.

As shown in FIG. 5, the table 81 is content indicating performance of three companies for each fiscal year from 2008 to 2010. The table 81 is formed of cells arranged in rows and columns. Items (direction words) are already written in five cells of the top row. Company names are already written in cells of the leftmost column. Items (sales, recurring profit, company popularity ratings) of rows are already written in cells of the column second from the left. In the table 81, yet-to-be-written information is concrete values of performance for each fiscal year and concrete values of company popularity ratings (ranks). In cells where yet-to-be-written information is to be added, i.e., in twenty-seven cells corresponding to three columns from the right except the top row cells, an index 51 ("TBD"), which is one of registered indices, and attribute data 64 ("number"), which is one of attribute data sets, are described on a cell-by-cell basis. In short, the table 81 has twenty-seven unfinished parts.

After detecting the unfinished parts of the document 7, the MFP 1 assumes, based on written information around the unfinished parts, what the yet-to-be-written information to be added by a creator of the document 7 is like. In the illustrated example of FIG. 5, it is known, from format data accompanied with the document 7, that the unfinished parts correspond to cells of the table. It is also known, from table-format-related knowledge that the upper and left parts of a table show items of columns and rows respectively, that yet-to-be-written information in each of the unfinished parts corresponds to item-related information. The table-format-related knowledge is contained in the knowledge database 43. For example, it is known that sales are to be incorporated as yet-to-be-written information of a cell corresponding to the third column from the left and the second row from the top row. In particular, it is known that the sales in 2008 is to be incorporated as the yet-to-be-written information of the cell. More particularly, it is known that the sales of a company named "ABCD beverage" in 2008 is to be incorporated as the yet-to-be-written information of the cell. Since the sales are numerical values, the result of the assumption matches attribute (numerical data) indicated by the attribute data 64.

Subsequently, the MFP 1 generates a search job to obtain yet-to-be-written information. The MFP 1, then, sends the generated search job to one or more receiving ends on the network 9. Referring to FIG. 5, a character string 402 of "source: LMN Research Institute" is described in the margin of the bottom-right corner of the table 81. It is known, from the character string 402, that the creator of the document 7 intends to use information provided by LMN Research Institute. In view of this, in the case of creating the search job, a server of LMN Research Institute is selected, as one of access target servers. FIG. 6 is a diagram showing an example of data details of a search job 91 to obtain yet-to-be-written information in the table 81.

The MFP 1 updates the table 81 of the document 7 based on a search reply from an external server that has received the search job 91. FIG. 7 shows a post-update table 81b. As is clear from the comparison between FIG. 5 and FIG. 7, cells of the third and fourth columns from the left of the post-update table 81b contain concrete numerical values relating to statistics in 2008 and 2009 in such a manner that the indices 51 and the attribute data 64 are replaced with the concrete numerical values (it should be noted that the values in FIG. 7 are imaginary values for exemplification). The values of the sales and the recurring profits are expressed in the unit of the amount indicated by the character string 401 in the margin of the upper-right corner of the table 81.

Referring to FIG. 7, no concrete numerical values are written in cells of the rightmost column, and the indices 51 and the attribute data 64 are still described therein. Stated differently, the table 81b shows an edit result for a case where the yet-to-be-written information with respect to 2008 and 2009 can be obtained from the server, and no yet-to-be-written information with respect to 2010 can be obtained from the server. Such a case happens, for example, when the yet-to-be-written information search was made in a period during which 2010 statistics have not yet been published, e.g., in 2010 or before 2010.

If a part or the whole of yet-to-be-written information that was intended to be obtained by executing the search job cannot be obtained, it is possible to attempt to obtain yet-to-be-written information again. If no search is substantially made due to a system down of the server or circuit disturbance thereof, transmission of search job may be repeated until the number of transmission times reaches a set number of transmission times. If desired information is not obtained from a selected specific server, another server may be selected and the search job may be sent thereto. If no yet-to-be-written information exists on the network 9 until a predetermined time is reached as with the example of FIG. 7, the search job may be sent after the predetermined time is reached. The MFP 1 checks whether or not all the documents stored in the box 35 or a document designated by the user is an incomplete document at a preset time point or in a response to a command given by the user. The MFP 1, then, performs automatic editing on the incomplete document. At this time, the MFP 1 refers to the search job that was created for the previous automatic editing on the document, and modifies the search job if necessary. For example, it is possible to modify the search job in such a manner to exclude, from the search target, the yet-to-be-written information that was obtained previously.

FIG. 8 is a diagram showing an example of an operating history recorded by the MFP 1. According to the exemplified operating history 46, the MFP 1 accesses two servers, a good reply is obtained only from one of the servers, i.e., the server of LMN Research Institute, and information obtained from the server is reflected in a page having a page number of "13". The user is able to access a server of a Web site concerned with the automatic editing by entering a URL described in the operating history 46 into a Web browser.

Figure 9:
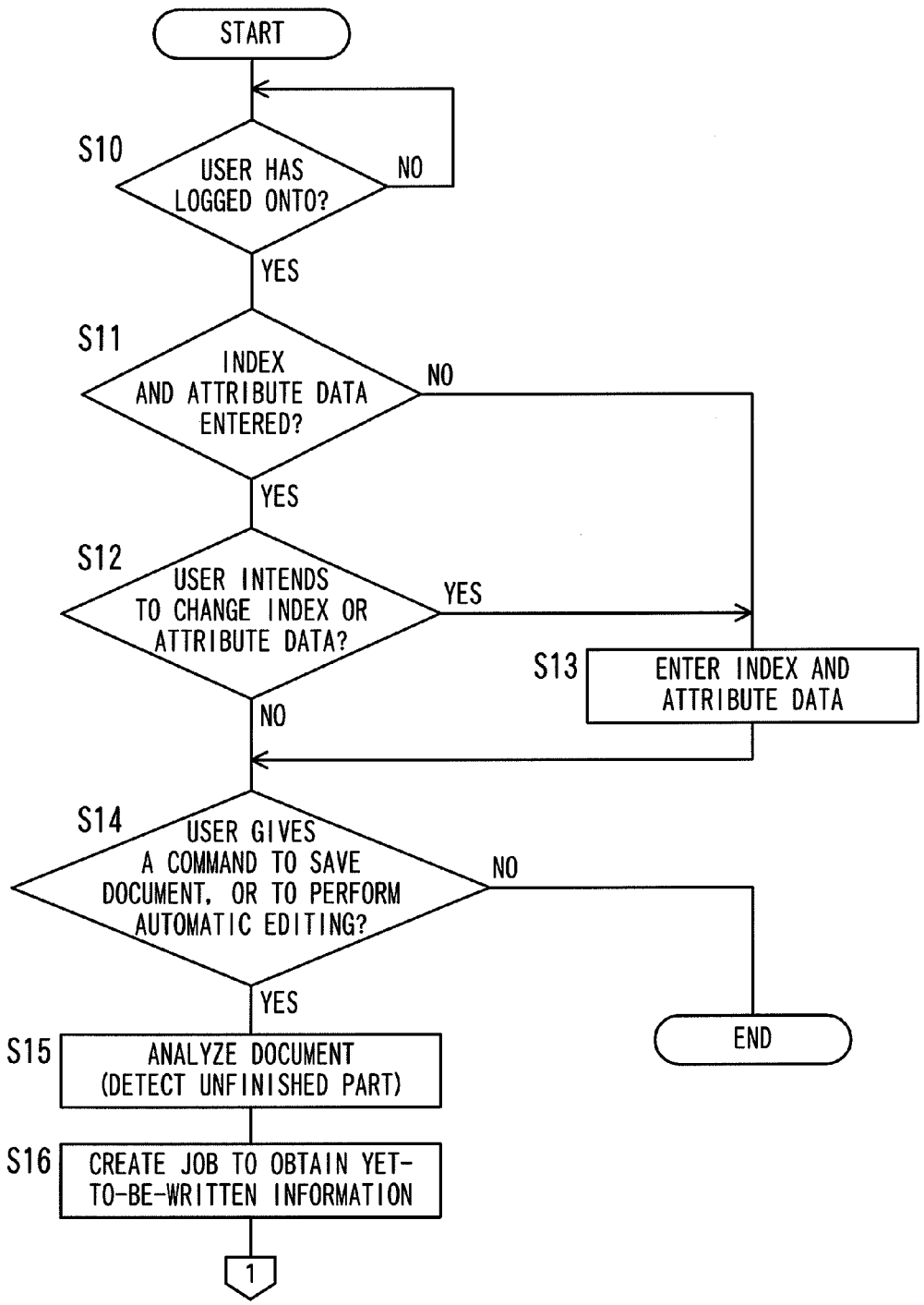
FIG. 9 is a flowchart depicting an example of the flow of automatic-editing-related processing performed by an MFP.
Figure 10:
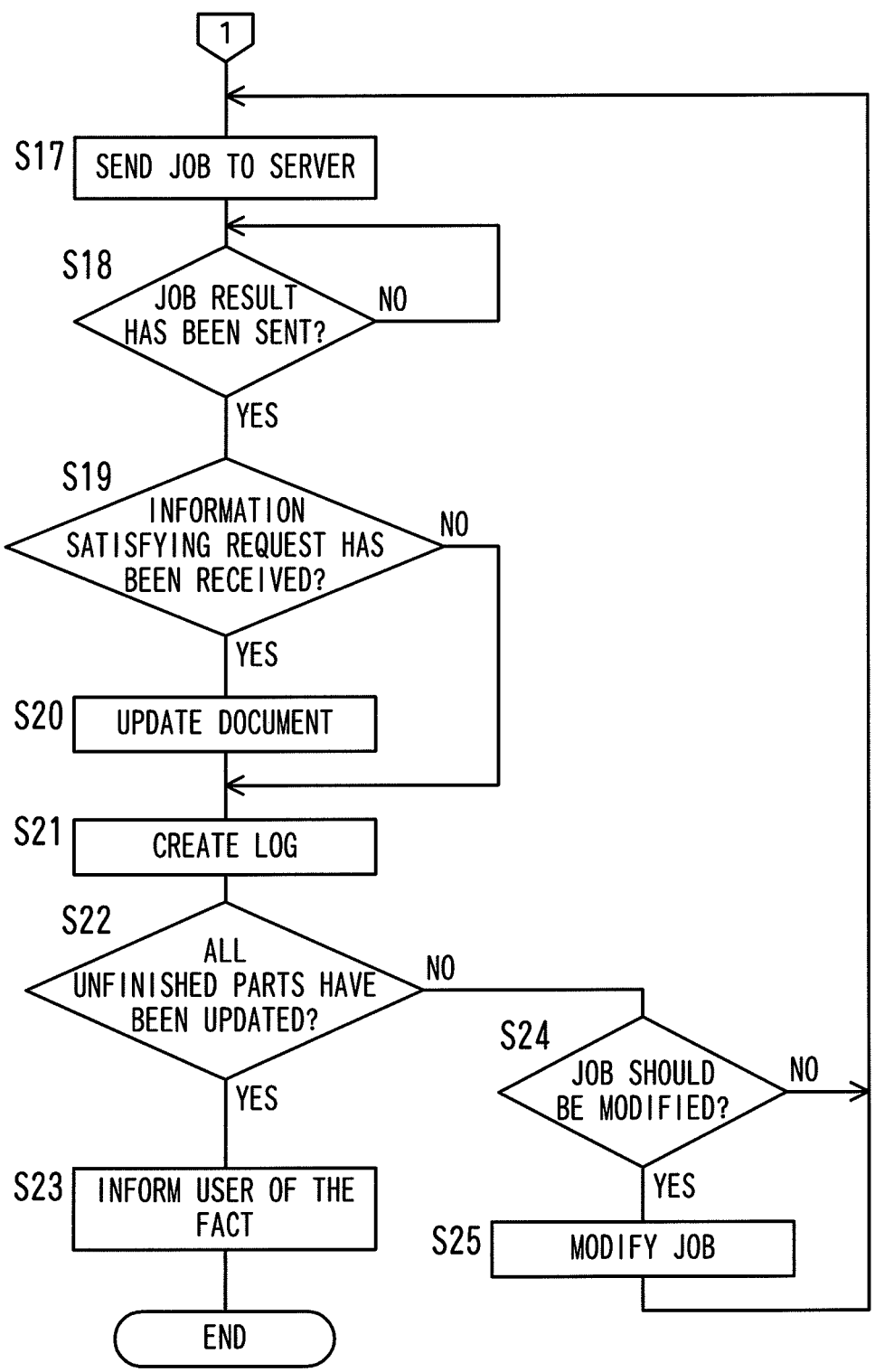
FIG. 10 is a flowchart depicting an example of the flow of automatic-editing-related processing performed by an MFP.

FIGS. 9 and 10 are flowcharts depicting an example of the flow of automatic-editing-related processing performed by the MFP 1. When a user is successfully authenticated and logs onto the MFP 1 (Yes in S10), the MFP 1 checks whether or not data is registered in the keyword table 42 (S11). If at least one keyword is not registered as an index of an unfinished part, and if at least one keyword is not registered as attribute data (No in S11), then the process goes to Step S13. If the user performs operation for designating a setting mode of the keyword table 42 (Yes in S12), then the process also goes to Step S13.

In Step S13, the MFP 1 accepts keyword entry by the user. For the keyword entry, a software keyboard displayed in the operating panel is used, for example. The MFP 1 writes the keyword entered by the user onto the keyword table 42.

When the user instructs the MFP 1 to save a document, or, to perform automatic editing on a document already stored therein (Yes in S14) under a state where indices and attribute data are registered, and where an unfinished part is detectable, the MFP 1 starts data processing relating to automatic editing. First, the detecting unit 102 analyzes the document to detect an unfinished part (S15). Subsequently, the obtaining portion 103 generates a search job to obtain yet-to-be-written information (S16), and sends the search job to a server on the network (S17 of FIG. 10). The obtaining portion 103, then, waits for the server to send a response to the search job (S18). When the obtaining portion 103 obtains information satisfying the request (Yes in S19), the editing portion 104 fills out the obtained information in the unfinished part (S20). Thereby, the document is automatically updated.

The recording portion 106 creates an operating history (log) in order to enable the user to know the development of communication with the server (S21) if information to be filled out in the unfinished part can be obtained, and even if this is not the case.

When all the unfinished parts of the document are filled out with information to be written thereinto, in other words, when there are no more unfinished parts to be updated by using the automatic editing function (Yes in S22), the informing portion 105 informs the user that the automatic editing is completely finished (S23). On the other hand, when unfinished parts still remain in the document (No in S22), the obtaining portion 103 checks whether or not the search job previously sent may be used as a search job to be sent again (S24). In accordance with the check result, the MFP 1 sends the same search job as the previous one or a search job obtained by modifying the previous search job (S25, S17). A representative example of the modification to the search job is to change a server to which a search request is to be made.

Second Embodiment

Figure 11A:
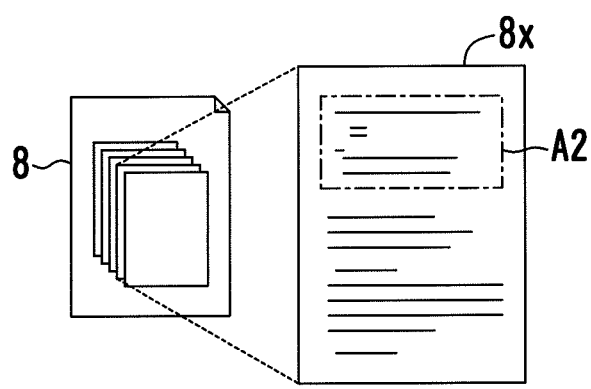
FIGS. 11A-11C are diagrams showing a second example of automatic editing.

FIG. 11A schematically shows a document 8 according to a second example of the automatic editing. The document 8 has pages one of which is Page 8x. Page 8x contains a region A2 enclosed by a dot-dash line. The region A2 contains, as shown in FIG. 11B, six character strings 501, 502, 503, 504, 505, and 506 corresponding to different rows.

Figure 11B:
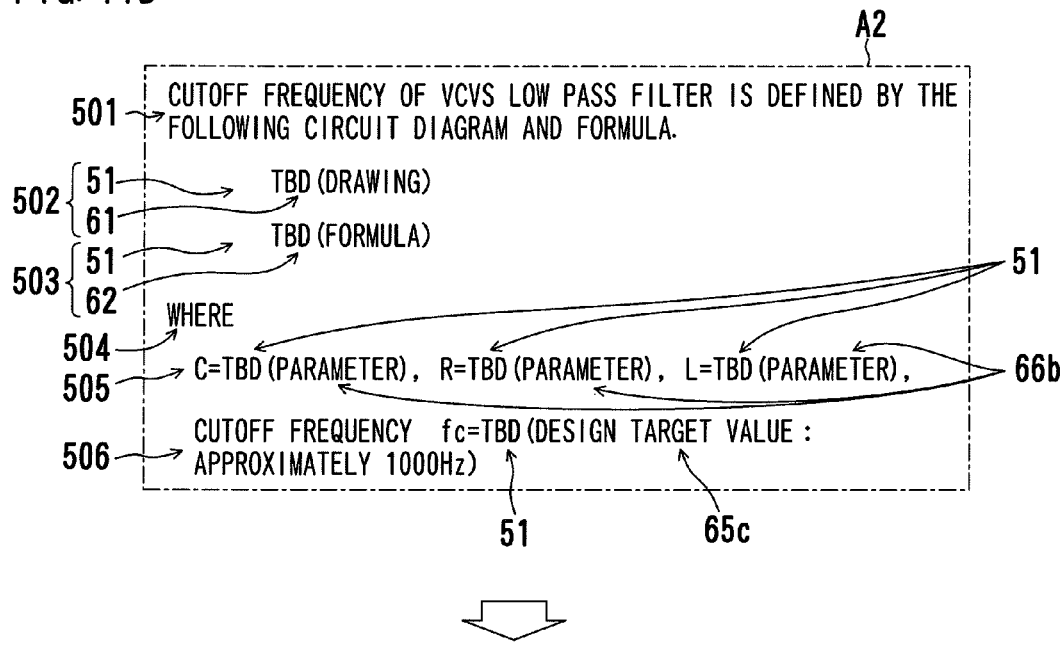

Referring to FIG. 11B, the uppermost character string 501 and the fourth top character string 504 do not have any indices and attribute data. In contrast, the second top character string 502 contains an index 51 and attribute data 61, and the third top character string 503 contains an index 51 and attribute data 62. The fifth top character string 505 contains three sets of an index 51 and attribute data 66b, and the sixth top character string 506 contains one set of an index 51 and attribute data 65c. In short, six unfinished parts in total are provided in the region A2.

Figure 11C:
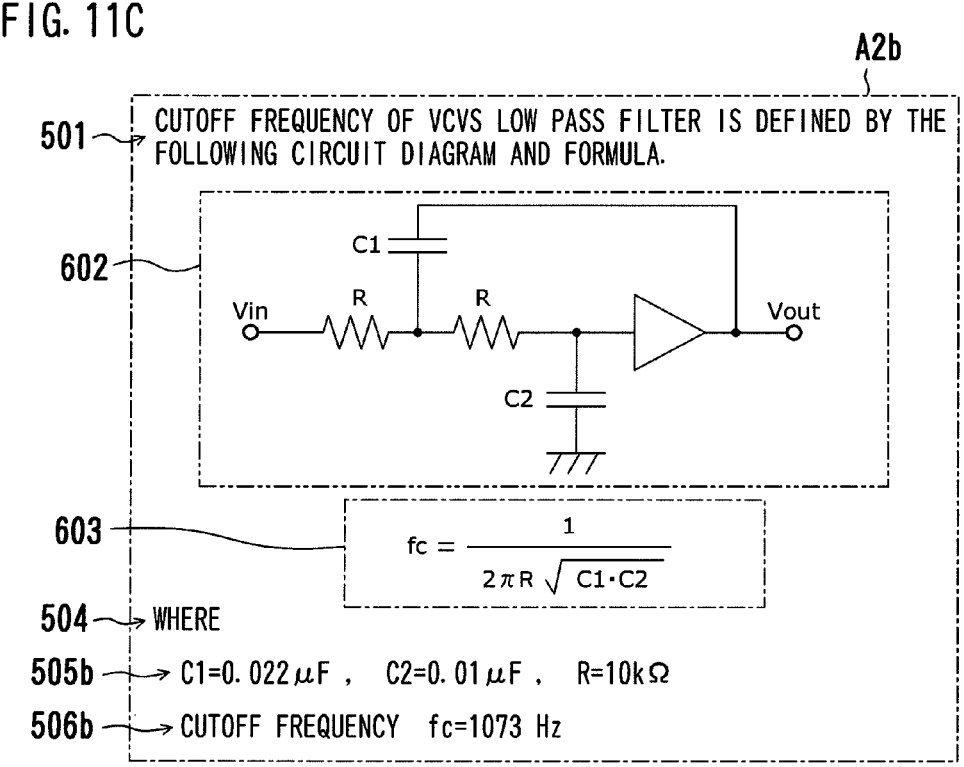

FIG. 11C shows a post-update region A2b that is obtained by performing the automatic editing on the region A2. The upper end of the region A2b is located at the same position in the document 8 as that before the update. The region A2b is large as compared to the region A2 because diagrams and mathematical formulas are described instead of the character strings through the automatic editing. As is clear from the comparison between FIG. 11B and FIG. 11C, the post-update region A2b contains a circuit diagram 602 instead of the character string 502, and a mathematical formula 603 instead of the character string 503. Stated differently, the circuit diagram 602 and the mathematical formula 603 follow the character string 501, and the character strings 502 and 503 are deleted. Also, the character strings 505 and 506 are replaced with the character strings 505b and 506b, respectively. Referring to the character string 505b, quantifiers "C", "R", and "L" of the original character string 505 are changed to quantifiers "C1", "C2", and "R" to conform with the mathematical formula 603, and concrete values (0.022 µF, 0.01 µF, 10 kΩ) of parameters corresponding to the quantifiers are embedded. In the character string 506b, a concrete value (1073) of cutoff frequency is embedded. The contents of the character strings 501 and 504 remain unchanged.

The information indicated in the character strings 501 and 504 are used to generate a search job to perform automatic editing on the document 8. The character strings 501 and 504 correspond to information in the vicinity of unfinished parts. The character string 501 includes keywords such as "VCVS low pass filter", "cutoff frequency", "circuit diagram", "formula", and "define". The character string 504, i.e., "where", is one of terms used for a case where additional information on letters of the mathematical formula immediately before the character string 504 is given immediately after the character string 504. A search job 92 shown in FIG. 12 is generated based on attributes (drawing, formula, variable data, and design target value) indicated in the attribute data 61, 62, 66b, and 65c of the region A2, and the information indicated in the character strings 501 and 504.

Figure 13:
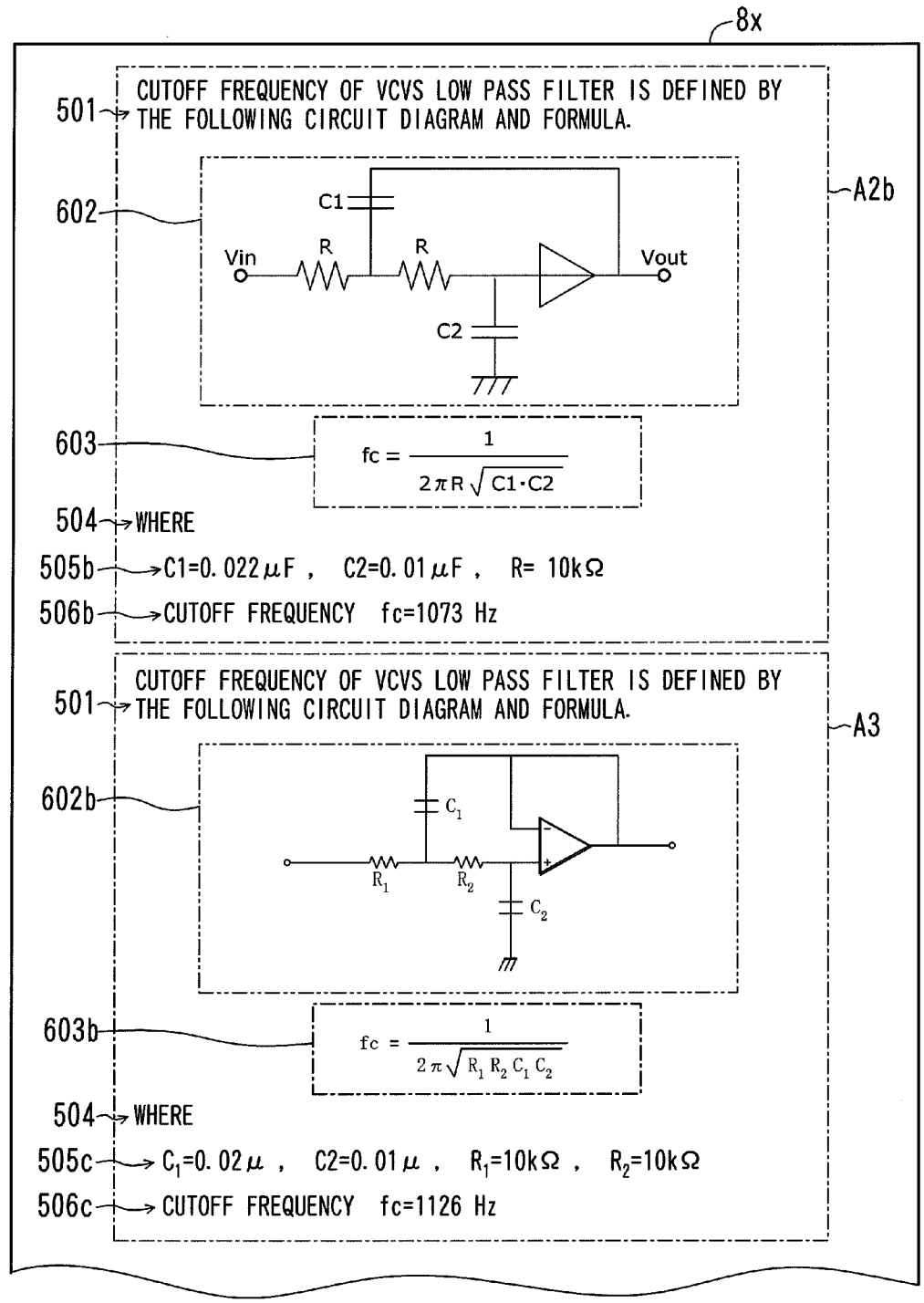
FIG. 13 is a diagram showing another example of an edit result according to a second example of automatic editing.

FIG. 13 shows another example of the edit result. In the illustrated example, Page 8x, which is one of pages of the document 8, contains two regions A2b and A3 each corresponding to the region A2 before being updated. As with the case of FIG. 11C, the region A2b contains the character strings 501, 504, 505b, and 506b, the circuit diagram 602, and the mathematical formula 603. The region A3, provided below the region A2b, contains the character strings 501, 504, 505c, and 506c, the circuit diagram 602b, and the mathematical formula 603b.

When good search replies to the search job 92 are obtained from the individual servers, for example, the MFP 1 incorporates the search replies into the document 8 in such a manner that a plurality of pieces of the obtained information are provided side by side as shown in FIG. 13. This enables the creator of the document 8 to compare and review the plurality of pieces of information automatically obtained. An ordinary document creation application is used to easily retain information which is determined to be appropriate by the creator, and to delete the other information.

When a plurality of search replies are obtained, it is also possible to make a duplicate of the original document file for each search reply, and create document files in which the search replies are reflected separately, instead of the example of FIG. 13 in which the search replies are reflected in one document file.

Third Embodiment

Even if the MFP 1 sends a search job, yet-to-be-written information is not always obtained from a server on the network 9. To cope with this, the MFP 1 is equipped with a function not only to gather information mechanically through communication with a sever on the network 9 but to perform communication for gathering information manually.

When information corresponding to yet-to-be-written information cannot be obtained from a server on the network 9, the MFP 1 asks an information provider registered in advance to provide the MFP 1 with information. The information provider herein is a person who has advanced knowledge in a particular area. For example, an expert at each section of a company where the MFP 1 is installed, or a specialist called a walking dictionary is selected as the information provider. It is also possible to register, as the information provider, a person outside the company (professor, researcher, and other intellectuals) from who approval for the registration is gained in advance.

FIG. 14 shows an example of an information provider list 44 to be referred to for making an information provision request. In the information provider list 44, data is classified based on the information field. Further, the name of a provider, a method to contact the provider, and a correspondence address of the provider are registered. In the illustrated information provider list 44, e-mail and twitter are taken as examples of the method to contact the provider. In the case of using e-mail, the obtaining portion 103 sends an e-mail message 95 containing a text exemplified in FIG. 15 to a predetermined correspondence address. In the case of using twitter, the obtaining portion 103 sends a message requesting a provider to see a bulletin board where the same text as the e-mail message 95 of FIG. 15 is shown. Another configuration is possible in which the informing portion 105 sends an e-mail message or message in response to instructions from the obtaining portion 103.

The obtaining portion 103 of the MFP 1 monitors whether or not a reply from an information provider is received, and performs a process for reflecting information provided as the reply in the corresponding document. If the information thus provided corresponds to yet-to-be-written information requested by the MFP 1, then the obtaining portion 103 causes the editing portion 104 to perform document update to write the information into the document. If the information thus provided indicates the source of the yet-to-be-written information, then the obtaining portion 103 creates a search job based on the provided information and attempts to obtain the yet-to-be-written information. When the yet-to-be-written information is successfully obtained, the obtaining portion 103 causes the editing portion 104 to perform the document update.

Figure 16:
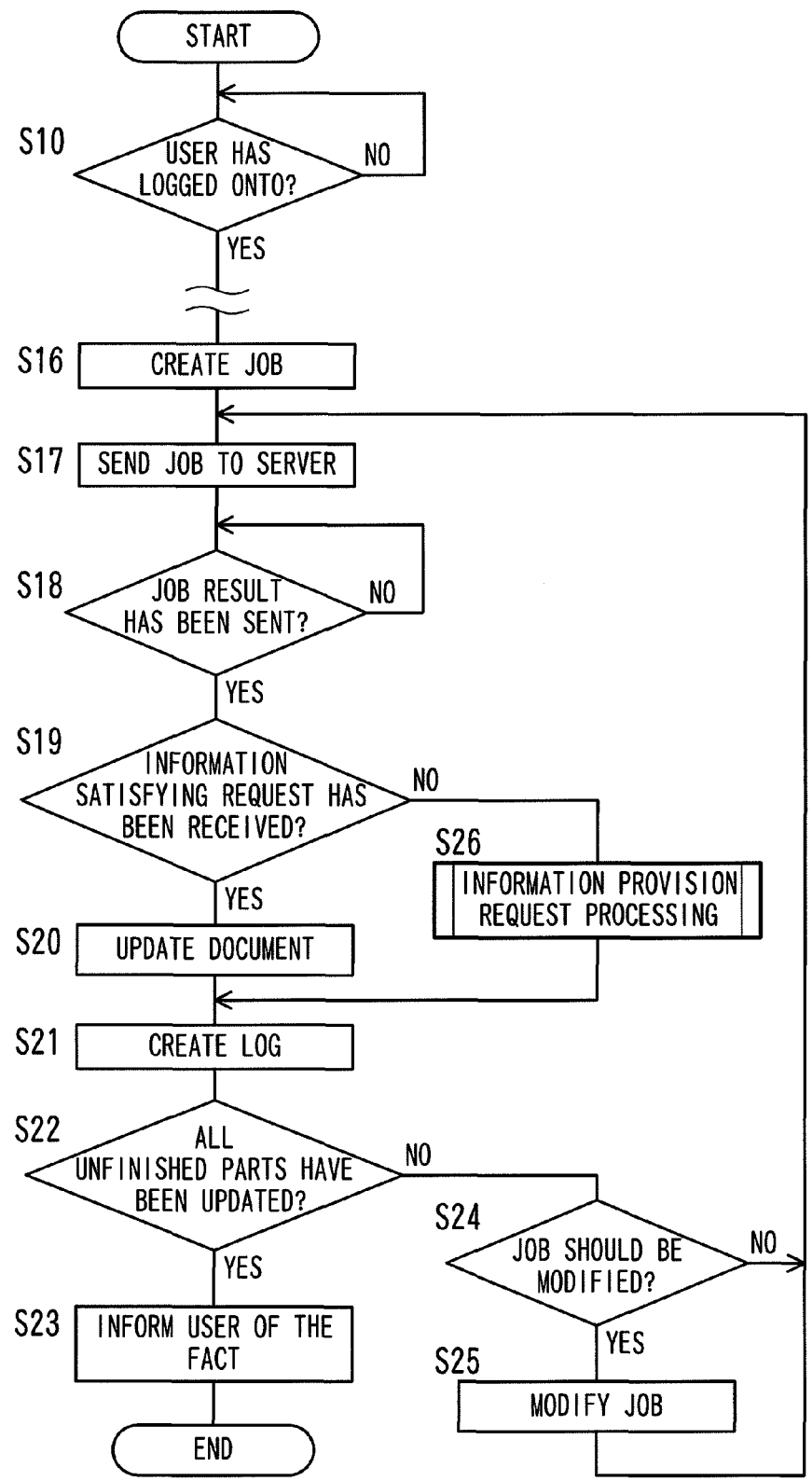
FIG. 16 is a flowchart depicting another example of the flow of automatic-editing-related processing performed by an MFP.

FIG. 16 is a flowchart depicting an outline of the flow of automatic-editing-related processing including information provision request processing. Most processing steps shown in FIG. 16 are the same as those of FIG. 10. The processing of Step S10 through Step S25 including non-illustrated Step S11 through Step S15 is the same as that shown in FIG. 10. The processing of FIG. 16 differs from the processing of FIG. 10 in that, if a check result in Step S19 is No, information provision request processing is performed in Step S26 before the process goes to Step S21.

Figure 17:
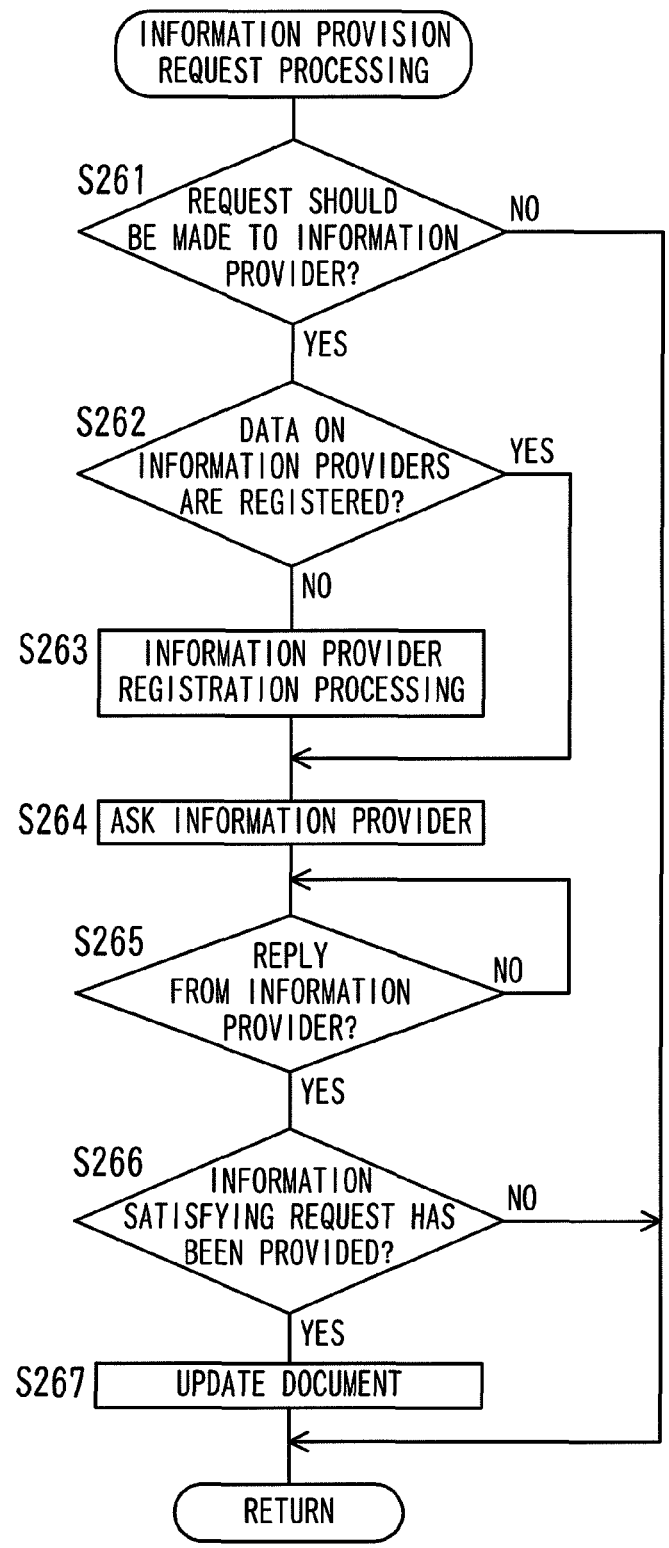
FIG. 17 is a flowchart depicting an example of the flow of information provision request processing.

FIG. 17 is a flowchart depicting an example of the flow of the information provision request processing. In this subroutine, the obtaining portion 103 determines whether or not a request is to be made to an information provider (S261). If the obtaining portion 103 determines that such a request is unnecessary (No in S261), then the process returns to the main routine immediately. The case where such a request is unnecessary is, for example, a case where yet-to-be-written information is information that is obviously unavailable, i.e., does not exist, at this time point, as the example shown in FIG. 5.

If determining that such a request is necessary (Yes in S261), then the obtaining portion 103 refers to the information provider list 44 and requests information from an information provider suitable for the yet-to-be-written information to be obtained (S262 and S264). If there is no information provider in the field relating to the yet-to-be-written information, or, alternatively, if a filed relating to the yet-to-be-written information is unclear, then the obtaining portion 103 requests information from all of information providers registered in the information provider list 44. If no information provider is registered in the information provider list 44 (No in S262), then registration processing is performed (S263), and after that, an information provision request is made (S264). As the registration processing, the MFP 1 prompts a user or an administrator of the MFP 1 to register an information provider, and registers data entered by the user or the administrator in the information provider list 44.

The obtaining portion 103 waits for a reply from an information provider (S265). When the obtaining portion 103 obtains information corresponding to the request (Yes in S266), the editing portion 104 updates the document (S267).

Figure 18:
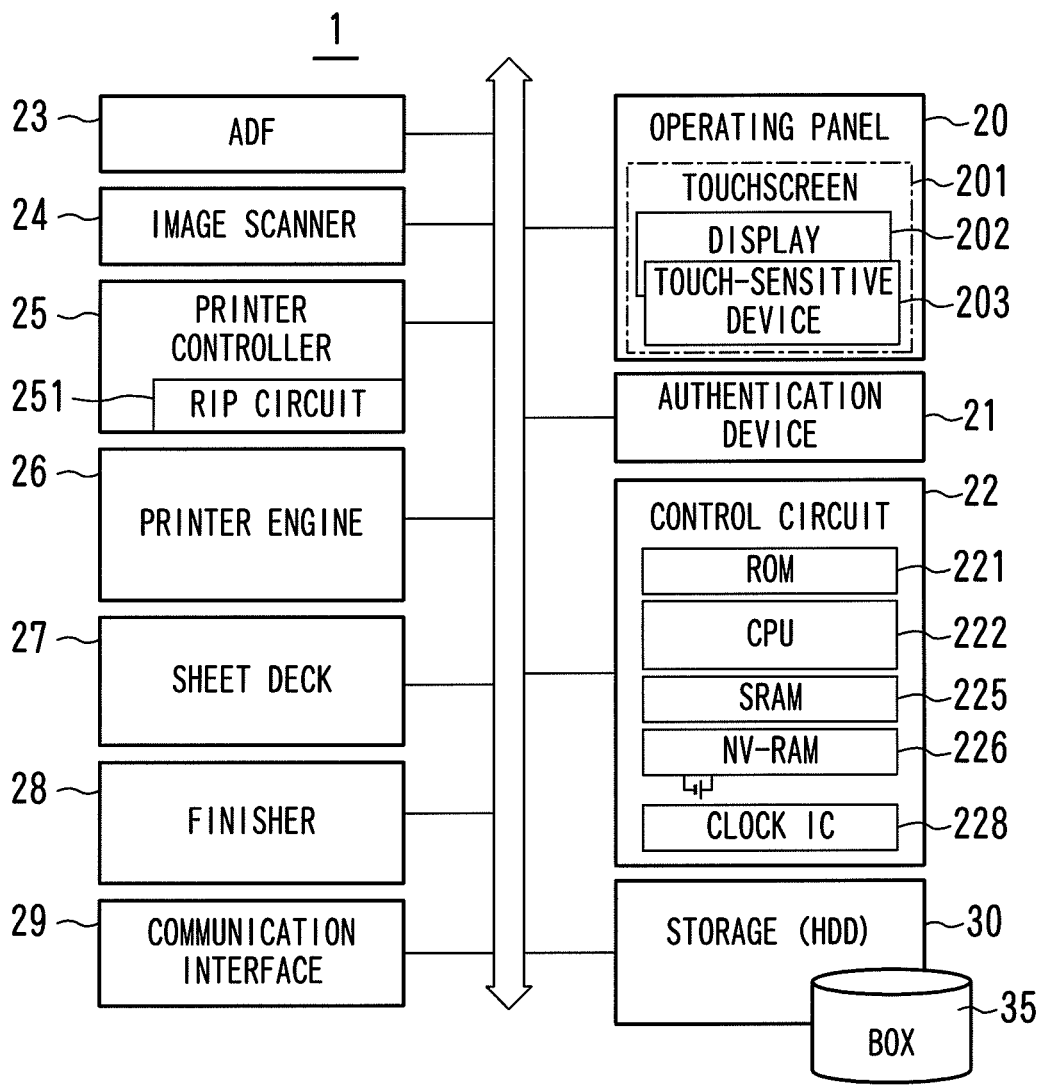
FIG. 18 is a block diagram showing an example of the hardware configuration of an MFP.

FIG. 18 is an example of the hardware configuration of the MFP 1 that automatically edits the document 7 or 8 as discussed above.

The MFP 1 is provided with an operating panel 20 having a touchscreen 201. The touchscreen 201 includes a display 202 for displaying operating screens and document data, and a translucent touch-sensitive device 203 provided to make close contact with the display 202. The front face of the touchscreen 201 serves as a screen and also as a touch operation surface. The operating panel 20 has fixed-keys including non-illustrated numerical keys, in addition to the touchscreen 201.

An authentication device 21 serves to read out identification data from a user card owned by a user who is to logon to the MFP 1. Note that any authentication method may be used, and a device compatible with the authentication method to be used is deemed as the authentication device 21. The authentication device 21 may be, for example, a sensor for reading out biometric information of the user, or a keyboard through which authentication information is manually entered.

The MFP 1 has a control circuit 22 for controlling an overall operation of the MFP 1. The control circuit 22 is configured of a Read Only Memory (ROM) 221 for memorizing a control program, a Central Processing Unit (CPU) 222 for executing the control program and a variety of applications, a Static Random Access Memory (SRAM) 225 used as a work area for program execution, a battery-backup Non-volatile RAM (NV-RAM) 226 for storing a variety of settings, a clock Integrated Circuit (IC) 228 for counting the system time, and so on.

An automatic document feeder (ADF) 23 is provided with a document tray. In the case of copying, scanning, or facsimile transmission, the ADF 23 feeds a document sheet placed on the document tray to a scan position by an image scanner 24. The image scanner 24 serves to optically read out image information recorded on the document sheet placed at the scan position. A printer controller 25 is operable to perform various control processing for printing. The printer controller 25 is provided with a Raster Image Processor (RIP) circuit 251 that serves to analyze Page Description Language (PDL) data sent from an external device and expand print target data on a bitmap memory. A printer engine 26 is operable to print a monochrome or color image on a single side or both sides of paper supplied from a multi-stage sheet deck 27. A finisher 28 is used to apply a finish of folding a printed sheet in two, or of stapling a printed sheet. A communication interface 29 connects the MFP 1 to the LAN 6 and a telephone line, and thereby communication between the MFP 1 and external devices is made possible. A storage 30 is a mass storage device such as a hard disk drive (HDD). The storage 30 is provided with boxes 35 that are data folders for storing various document files therein.

The foregoing embodiments produce the following benefits and advantages:

(1) A job to request a server on a network to conduct a search is automatically created. Information obtained by executing the job is embedded in a document, so that the document is automatically updated. A document creator describes, at any part of the document, data indicating information attribute and the presence of the part. Thereby, desired information to be written can be automatically incorporated into the document, which saves the workload to collect such desired information.

(2) A user designates an attribute of information, which makes it possible to embed information corresponding to the attribute designated by the user.

(3) Even when necessary information is not obtained, a search job is automatically modified and executed again. This reduces a task for the user to conduct a search to make the document close to the completed state. As for information which is impossible to obtain until a predetermined time is reached, since a search job is executed after the predetermined time is reached, unnecessary search can be reduced.

(4) When necessary information cannot be obtained through searching in a computer, an information provision request is automatically sent to an information provider. This saves the user from having to contact an information provider to gather information.

(5) Records are left as to what kind of search job is requested and to which server the request is sent in order to obtain information. This enables a user to confirm later the reliability of the information that is added automatically.

(6) In the case where search replies are obtained from a plurality of servers, a user can select the most appropriate reply.

The embodiments discussed above are directed to a case where a user is informed at a time when automatic update is completely made to all unfinished parts of the document 7 or 8. Instead of this, however, it is possible to contact a user at a time when the whole or a part of unfinished parts is updated.

In the foregoing embodiments, the data structure of the keyword table 42, the information provider list 44, the operating history 46, and the search jobs 91 and 92 are not limited to the illustrated examples and may be modified appropriately.

In automatic editing performed on a document scanned by the image scanner 24, an Optical Character Recognition (OCR) technique capable of discerning a character, an image, and a ruled line from one another can be used to analyze the document, as with the case of a document of format data created with a computer.

The search job 91 or 92 may be a job to make a request for text search by using a combination of keywords, or a job to make a request for search for predetermined attribute information by analyzing a tag of document data described in a markup language such as a Hypertext Markup Language (HTML) or an Extensible Markup Language (XML). Alternatively, the search job 91 or 92 may be a job to make a request for the combination of the foregoing search.

Aside from the original document and a document obtained by updating the original document, a document obtained by combining only parts of the original document updated by the editing portion 104 may be created in order to increase the user convenience for check operation.

The present invention is applicable to an image forming apparatus other than the MFP, for example, to a printer or a facsimile machine.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus configured to store document data therein and to perform network communication, the image forming apparatus comprising:
   a detection portion configured to detect, from a document to be saved, an unfinished part where a detection index and attribute data are described, the attribute data indicating an attribute of yet-to-be-written information to be written into the unfinished part;
   an obtaining portion configured to obtain information to be written into the unfinished part from a server connected to the image forming apparatus via a network based on the attribute data and information which is described in a vicinity of the unfinished part and is identified from format data accompanied with the document data; and
   an editing portion configured to perform automatic editing by which the information obtained from the server is written into the unfinished part.

2. The image forming apparatus according to claim 1, wherein, when the information to be written into the unfinished part is not obtained from the server, the obtaining portion performs communication with a predetermined information provider to request the information provider to provide information relating to the yet-to-be-written information.

3. The image forming apparatus according to claim 2, wherein the editing portion writes, into the unfinished part of the document, the information provided by the information provider through communication.

4. The image forming apparatus according to claim 1, further comprising a recording portion configured to make a record of an operating history, the operating history enabling a user to check the information obtained from the server.

5. The image forming apparatus according to claim 1, further comprising a document management portion configured to give, to a post-update document in which the information is written into the unfinished part by the editing portion, a file name different from a file name of a pre-update document, and to save the post-update document.

6. The image forming apparatus according to claim 1, further comprising an informing portion configured to inform a user who has given a command to save the document that the document has been updated by the editing portion.

7. The image forming apparatus according to claim 1, wherein at least one set of character data entered by a user is stored as the detection index, and at least one set of character data entered by the user is stored as the attribute data.

8. A method for automatically editing document data comprising:
   detecting an unfinished part where a detection index and attribute data are described from a document to be saved in an image forming apparatus configured to store document data therein and to perform network communication, the attribute data indicating an attribute of yet-to-be-written information to be written into the unfinished part;
   obtaining information to be written into the unfinished part from a server connected to the image forming apparatus via a network based on the attribute data and information which is described in a vicinity of the unfinished part and is identified from format data accompanied with the document data; and
   writing the information obtained from the server into the unfinished part.

9. A non-transitory computer-readable storage medium storing thereon a computer program executed in an image forming apparatus configured to store document data therein and to perform network communication, the computer program causing a computer included in the image forming apparatus to implement:
   detection processing for detecting an unfinished part where a detection index and attribute data are described from a document to be saved, the attribute data indicating an attribute of yet-to-be-written information to be written into the unfinished part;
   obtaining processing for obtaining information to be written into the unfinished part from a server connected to the image forming apparatus via a network based on the attribute data and information which is described in a vicinity of the unfinished part and is identified from format data accompanied with the document data; and
   editing processing for performing automatic editing by which the information obtained from the server is written into the unfinished part.

10. The non-transitory computer-readable storage medium according to claim 9, wherein, when the information to be written into the unfinished part is not obtained from the server, the obtaining processing includes performing communication with a predetermined information provider to request the information provider to provide information relating to the yet-to-be-written information.

11. The non-transitory computer-readable storage medium according to claim 10, wherein the editing processing includes writing, into the unfinished part of the document, the information provided by the information provider through communication.

12. The non-transitory computer-readable storage medium according to claim 9, wherein the computer program further causes the computer to implement recording processing for making a record of an operating history, the operating history enabling a user to check the information obtained from the server.

13. The non-transitory computer-readable storage medium according to claim 9, wherein the computer program further causes the computer to implement document management processing for giving, to a post-update document in which the information is written into the unfinished part through the editing processing, a file name different from a file name of a pre-update document, and saving the post-update document.

14. The non-transitory computer-readable storage medium according to claim 9, wherein the computer program further causes the computer to implement informing processing for informing a user who has given a command to save the document that the document has been updated through the editing processing.

15. The non-transitory computer-readable storage medium according to claim 9, wherein the computer program causes the image forming apparatus to store, as the detection index, at least one set of character data entered by a user, and to store, as the attribute data, at least one set of character data entered by the user.

* * * * *